(12) United States Patent
Mergler

(10) Patent No.: US 7,693,288 B2
(45) Date of Patent: Apr. 6, 2010

(54) REMOTE CONTROL SYSTEM AND RELATED METHOD AND APPARATUS

(75) Inventor: Iwo-Martin Mergler, Southampton (GB)

(73) Assignee: NXP B.V., Eindhoven (NL)

(*) Notice: Subject to any disclaimer, the term of this patent is extended or adjusted under 35 U.S.C. 154(b) by 140 days.

(21) Appl. No.: 10/589,111

(22) PCT Filed: Feb. 7, 2005

(86) PCT No.: PCT/IB2005/050484

§ 371 (c)(1),
(2), (4) Date: Aug. 10, 2006

(87) PCT Pub. No.: WO2005/078678

PCT Pub. Date: Aug. 25, 2005

(65) Prior Publication Data

US 2007/0173212 A1  Jul. 26, 2007

(30) Foreign Application Priority Data

Feb. 11, 2004  (GB) .................................. 0402952.6

(51) Int. Cl.
H04R 29/00 (2006.01)

(52) U.S. Cl. .............................. 381/58; 381/77; 381/59; 381/105; 381/56; 381/79

(58) Field of Classification Search ................ 381/300, 381/303, 56–57, 15, 26, 58–60, 71.5, 91, 381/95, 101–108, 122, 109, 312, 315, 318, 381/77–78; 340/573.1, 539.26, 539.23, 539.13; 607/55–57

See application file for complete search history.

(56) References Cited

U.S. PATENT DOCUMENTS

| 4,918,736 A * | 4/1990 | Bordewijk .................. 381/315 |
| 5,012,520 A * | 4/1991 | Steeger ....................... 381/315 |
| 5,475,759 A * | 12/1995 | Engebretson ............... 381/318 |
| 5,708,421 A * | 1/1998 | Boyd ....................... 340/573.1 |
| 5,864,626 A * | 1/1999 | Braun et al. .................. 381/81 |
| 6,389,055 B1 * | 5/2002 | August et al. ............... 375/130 |
| 6,434,239 B1 * | 8/2002 | DeLuca ..................... 381/71.2 |
| 6,563,430 B1 | 5/2003 | Kemink et al. |
| 6,842,647 B1 * | 1/2005 | Griffith et al. ................. 607/57 |
| 6,856,688 B2 * | 2/2005 | Cromer et al. .............. 381/303 |

(Continued)

FOREIGN PATENT DOCUMENTS

WO  WO 01/35368  5/2001

OTHER PUBLICATIONS

Civanlar, M., "Protocols for Real-Time Multimedia Data Transmission Over the Internet," IEEE Proc. Acoustics, Speech and Signal Processing, pp. 3809-3812 (1998).

*Primary Examiner*—Xu Mei
*Assistant Examiner*—Disler Paul

(57) ABSTRACT

The invention provides for an audio system 10 comprising an audio signal generating means (12) for output of an audio signal (24), and a remote control device (14) for control of the audio signal generating means (12), the audio signal generating means (12) including means for including an identification signal within the audio output (12) and which serve to identify the audio signal generating means (12) from which the audio signal is output, the remote control device being arranged to receive the identification signal so as to identify the source (12) from which a particular audio signal (24) is output.

30 Claims, 1 Drawing Sheet

U.S. PATENT DOCUMENTS

Figure 1:
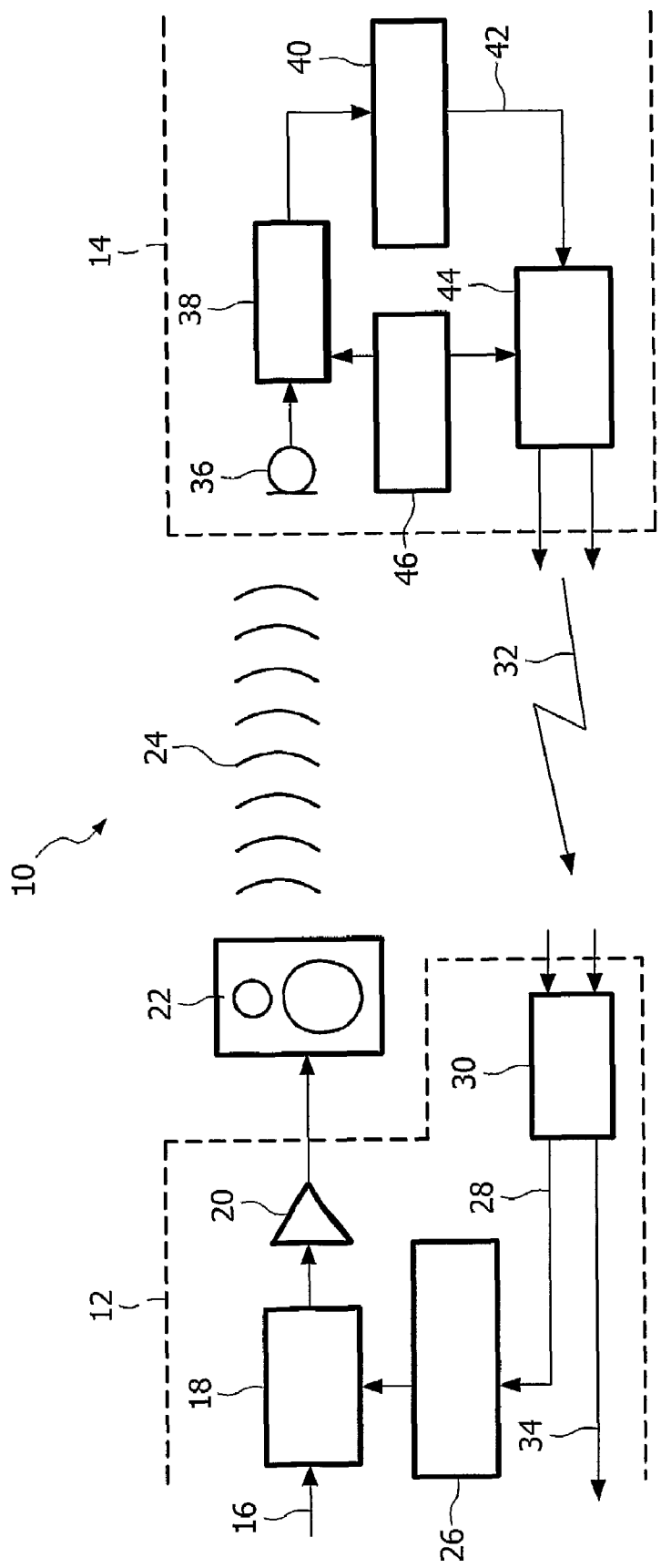

| | | | |
|---|---|---|---|
| 6,954,538 B2 * | 10/2005 | Shiraishi | 381/105 |
| 7,016,504 B1 * | 3/2006 | Shennib | 381/60 |
| 7,095,455 B2 * | 8/2006 | Jordan et al. | 348/734 |
| 7,224,808 B2 * | 5/2007 | Spencer et al. | 381/77 |
| 7,260,221 B1 * | 8/2007 | Atsmon | 380/247 |
| 2002/0133818 A1 * | 9/2002 | Rottger | 725/37 |

* cited by examiner

REMOTE CONTROL SYSTEM AND RELATED METHOD AND APPARATUS

The present invention relates to a remote control system for an audio output system and also to a method and to devices related thereto.

Remote control devices, particularly within domestic environments, have found wide use in relation to household electrical items such as stereo systems, television and video/DVD systems and serve to improve the ease and convenience with which the output delivered from such equipment can be controlled.

Although, for example, it is known to combine the control of a television apparatus and video apparatus within a single remote control device, most of the currently available household system generally requires its own remote control device and each of these generally emits an infra red control signal and so requires a line of sight to the equipment being controlled.

Thus, for a user having a variety of, for example, entertainment systems within a domestic environment, and requiring specific control of one particular piece of equipment within one of the systems, it is necessary to first locate the appropriate remote control device and then ensure that the remote control is operated within suitable proximity of the system being controlled.

Such requirements disadvantageously serve to limit the full advantages that can be achieved by means of a remote control unit and introduce a potential layer of inconvenience, possible delay, and possible user-frustration.

Also, as a desire to duplicate systems within a domestic environment, for example through the use of various television sets throughout the house, or the adaptation of further electrical equipment to be controllable by way of a remote control increases, then the disadvantageous limitations mentioned above become more readily perceptible and pronounced and therefore have the potential to cause an increase in user-frustration.

The present invention seeks to provide for an audio system, and related method of operation and devices having advantages over currently known such systems, methods and devices.

According to a first aspect of the present invention, there is provided an audio system comprising an audio signal generating means for output of an audio signal, and a remote control device for control of the audio signal generating means, the audio signal generating means having means arranged for including an identification signal within the audio output and serving to identify the audio signal generating means from which the audio signal is output, the remote control device being arranged to receive the identification signal and to identify the audio signal generating means from which the audio signal is output.

The said identification signal is advantageously provided as an inaudible signal and the audio signal generating means can advantageously be arranged to adjust the volume of the identification signal as required so as to retain the volume below a likely audible-threshold.

Advantageously, the identification signal is provided through modulation of the audio signal to be output.

The identification signal can comprise any form of appropriate watermark although one particular embodiment advantageously employs a Pseudo-Random Noise (PRN) signal.

As a further feature, the remote control device can be arranged to adjust the volume of the output audio signal responsive to a change in the magnitude of the identification signal received.

In this manner, if a user is moving within a particular environment with the remote control device, the volume of the audio signal output can be increased, or decreased, automatically as the user moves away from, or towards, the audio signal generating means so as to maintain a seemingly constant level of volume for the user.

The audio system can also be arranged so as to determine this distance between the audio signal generating means and the remote control device and on the basis of the received identification signal. This can assist the remote control device in determining which of one of a plurality of audio signal generating devices is nearest and therefore represents the most appropriate to be controlled.

The arrangement for determining the distance between the remote control device and the audio signal output means advantageously employs determines the timed receipt of a signal at the remote control device.

In particular, a time reference is generated at the remote control device and transmitted to the audio signal generating means so as to determine the subsequent timed receipt of the identification signal from the audio signal generating means.

Alternatively, or in addition, the timing reference signal can be generated at the audio signal generating means and transmitted to the remote control device. The remote control device is then advantageously adapted to include an appropriate channel and receiver for such timing reference data.

It should be appreciated that the distance measurement between the audio signal generating means and the remote control device can be determined on the basis of the timed receipt of the identification signal at the remote control device and from the known speed of sound.

Further, the audio system can include means arranged to determine the position of the remote control device relative to the audio signal generating means.

Such positional data can advantageously be calculated on the basis of the determination of a distance of the remote control device from at least two audio signal generating means. Since the audio system is likely to employ at least two channels, with, for example, respective loud speakers, each of the said two audio signal generating means can comprise each of the said at least two loud speakers driven by associated audio channels of an output device.

Each separate channel can then advantageously employ a different identification modulating signal for the respective output audio signal.

The remote control device can then advantageously be employed to control the respective volumes of the different channels of audio output from the audio signal generating devices in a manner responsive to the relative position of, and indeed changing position of, the user with regard to, for example, the two loud speakers.

In this manner, the balance between the two channels as perceived by the user can advantageously be maintained at a relatively constant value irrespective of the movement of the user relative to the positions of the two loud speakers. Of course, if more than two channels are available they can also be employed for position determination.

Yet further, the audio system can advantageously comprise a plurality of audio signal generating means provided at quite separate locations throughout, for example, the domestic environment. A change in position of the remote control device serves to provide a control signal to vary the output from the various audio signal generating means and with, for example loud speakers located throughout the house, the user can continue to listen to the audio output at an appropriate volume while moving throughout the house through the selected enabling and control of, for example, the loudspeaker(s) to which the user is nearest at any instant.

In such a manner, the audio system can be arranged to hand over between different audio signal generating devices to effectively follow the user throughout the house.

As will be appreciated, the above-mentioned advantageous features relating to the control of the audio signal generating devices in a manner responsive to the distance of remote control device from, or the relative position of the remote control device to, the one or more audio signal generating means is achieved through the adoption of the modulation of the acoustic output signal with data identifying the device from which the acoustic output signal is derived.

According to another aspect of the present invention, there is provided a method of controlling audio signal generating means arranged for the output of an audio signal and including the steps of including an identification signal within the audio output and which serves to identify the audio signal generating means from which the output is generated, and receiving, at a remote control device arranged for control of the audio signal generating means, the identification signal and processing the same so as to identify the means from which the audio signal was output so as to allow for delivery of a control signal from the remote control device to the identified audio signal generating means.

The method is advantageously further arranged so as to provide for the advantageous features discussed above in relation to the audio system.

According to yet another aspect of the present invention there is provided audio signal generating means for output of an audio signal and having means for including an identification signal with the output audio signal and serving to identify the audio signal generating means.

Advantageously, such an audio signal generating means can advantageously include the features from the audio system defined above so as to render such a device suitable for use in such a system.

According to a further aspect of the present invention, there is provided a remote control device for controlling an audio signal output from audio signal generating means, the remote control device being arranged to receive and process an identification signal from the audio signal generating means and so as to identify the audio signal generating means from which an audio signal is output.

Such a remote control device can include the advantageously preferred features of the audio system described above and so as to render it suitable for use within such a system.

The invention is described further hereinafter, by way of example only, with reference to the accompanying drawing which comprises a schematic diagram of an audio signal generating device, and a remote control device according to an embodiment of the present invention.

In relation to a domestic environment, it is thought that future developments will seek to adopt the environment so that the vast majority of electrical devices can exchange content with each other and which, advantageously, will require control in a readily useable, and simple, manner. Typical use scenarios comprise controlling video and audio sources in different rooms and such requirements will only serve to emphasize limitations in the current provision of generally one remote control per device since the user will then actively have to walk into the room in question, find the remote control and point it at the device to be controlled. Such a requirement generally runs contrary to the advances sought by such a "connected" domestic environment.

Turning now to the accompanying drawing, there is illustrated an audio system 10 comprising an acoustic source 12 and a remote control unit 14 for controlling the output from the acoustic source 12 and which can comprise one of a variety of home entertainment devices within a "connected" home.

Within the acoustic source 12, there is developed an audio signal 16, for example an audio signal representing music, which is delivered, by way of a modulator 18, to an audio amplifier 20 which in turn is arranged to drive a loud speaker 22.

The loud speaker 22 then emits sound waves 24 so that a user can listen to the required audio output from the source 12.

Within the acoustic source 12 there is also provided a PRM generator 26 which receives a timing reference signal 28 from a receiver 30.

The receiver 30 is arranged to receive control signals 32 from the remote control unit 14 and, in addition to outputting the time reference signal 28, the receiver 30 is also arranged to output control command signals 34.

Turning now to the remote control unit 14, this includes an appropriate transducer such as a microphone 36 for receiving the sound omitted from the loudspeaker 22 of the acoustic source 12. The microphone 36 is arranged to deliver the signal generated therein to the signal processing block 38 which can deliver positional data to a user interface 40. The user interface 40 provides for control commands 42 for a transmitter 44 which is arranged to provide the control signal 32 mentioned above. The control signal, as described below, can be provided by way of a radio or infrared channel.

Within the remote control unit 14 there is also a time reference block 46 arranged to deliver a time reference signal to both the signal processing block 38 and the transmitter 44.

As a summary of the operation of the audio system illustrated in the accompanying drawing, it should be appreciated that the audio signal 16 to be output from the audio signal generating means comprising the source 12 and associated loud speaker 22, is modulated, via the modulator 18 and PRN generator 26, by way of a PRN code signal.

The PRN code signal serves to identify the actual source, either the acoustic source 12, or the specific loud speaker 22, if more than one loud speaker is associated with the source 12, from which the sound 24 is emitted.

However, as discussed in further detail below, the PRN sequence added to, for example, their music signal 16, is in in-audible to the user.

As noted, the remote control unit 14 includes a microphone 36, which is arranged to extract the PRN signal and deliver it to the signal processing block 38 which provides for the full extraction of the data identifying the source of the sound 24.

Such an arrangement forms an important part of a feedback loop arising in accordance with the present invention in which, through merely being in the presence of the sound delivered from, for example, the loud speaker 22, the remote control unit 14 can determine the exact device, for example, the loud speaker 22, which is outputting the sound 24. An appropriate control command can then be transmitted by way of the transmitter 44, to the acoustic source 12, so as to ensure that it is that specific acoustic source 12 that is controlled in an appropriate manner so as to vary the output sound 24 as required. A single remote control device can then be provided for the accurate control of a plurality of output means.

As discussed further below, once having readily, and accurately, identified the particular audio signal generating device from which the sound 24 is output, it further becomes readily possible to determine the distance between the remote control unit and particular audio signal generating device, and further, the actual location of the remote control device relative to the audio signal generating means.

Such determination of distances and relative locations, can further be employed so as to enhance the manner in which the sound output 24 is controlled responsively merely to the position of the remote control relative to, or the distance from, the audio signal generating means. This further enhances the ease and accuracy with which an appropriate device can be controlled by the remote control, and in particular the manner in which a plurality of devices can be identified and subsequently controlled by a single remote control.

In this manner, a remote control unit arranged to control any one of a wide variety of the devices, in a manner requiring reduced user intervention, can readily be achieved.

From the above it will be appreciated that a variety of different levels of service may be implemented, trading complexity against functionality.

Firstly, for example, the mere identification of the sound source 12. This uses the hidden identification signal such as a PRN code sequence or other watermark in the sound 24 in order to allow the remote control device to identify the currently audible sound source 12. This then allows the user interface 40 of the remote control 14 to default to the identified source thus simplifying the most likely use scenario of the remote control 14. An adaptation to this is to arrange for the automatic adjustment to the audio volume of the source in order to keep a constant volume level at the position of the remote control device. In this manner, the control signal emitted from the remote control is selected from a variety of different possible control signals, to be one specific to the particular source 12 and to increase and decrease the volume of the output sound in the manner specified above.

As an enhancement to the mere identification of the sound source 12 the distance between the source 12 and the remote control 14 can readily be determined and this can help refine the user interface behaviour by improving arbitration between different sources and/or between different remote control devices.

As an extension to the mere measurement of the distance between the source 12 and the remote control 14 it becomes readily possible to compute the position of the remote control device relative to sound sources within for example a room. Potential applications for such an arrangement include moving the "sweet spot" i.e. the location of appropriate balance between for example stereo channels of an audio system to effectively follow the user in the room as the user moves relative to the two speakers. Yet further it would be possible to have an audio/video program effectively follow the user around the house. The later can be achieved by using dynamic volume control as discussed above and as discussed above and as well as handing over between different audio sources spaced around the house.

Returning to discuss the illustrated embodiment in more detail, it should of course be noted that one possible implementation is to add a PRN sequence to the music.

PRN sequence, may be adjusted in volume to stay below hearing threshold at all times, is known to the receiver part of the remote control 14 and is of course unique to each audio source. The remote control 14 can use the knowledge of the sequences to extract it from the microphone 36 signal, even when the volume of the PRN signal is significantly below the level of the sound 24.

For position determination, the carrier frequency should be selected to be as high as possible. On most audio equipment, it is feasible to reproduce sound up to low ultrasound frequencies and this, if possible, should be employed since the frequency is directly proportional to the accuracy with which positioning can be achieved.

The second advantage of high frequencies is that the sensitivity of human hearing drops off quickly towards higher frequencies and so selection of a high carrier frequency for the hidden identification signal will enhance the masking of the positioning signal.

As will be appreciated in order to measure the distance between the remote control 14 and the source 12, the remote control 14 must be synchronized to the source 12. Depending on the topology, several methods are possible. In the example shown, the remote control 14 is arranged to generate the time reference and then use the wireless or IR channel 32 for time transfer. Compared to the propagation speed of sound, this channel 32 can be regarded as instantaneous. In this case, the PRN generator 26 in the sound source 12 s synchronized by a special time signal from the remote control 12.

If the remote control 14 is provided with a bidirectional wireless/IR channel, it may be beneficial to place the time reference at the sound source. In the case of a system such as a "home multimedia centre", a single time reference may serve all remote control devices as well as all sound sources.

Many of the proposed scenarios for the so-called connected home already feature time synchronization, in order to allow synchronized content streaming via wireless connections between individual devices. For such systems, no additional synchronization would therefore be needed for adoption of the present invention.

Given the relative slow propagation speed of sound (~300 m/s), the synchronicity only has to be in order of milliseconds, which is easily achievable through methods such as Network Time Protocol (NTP1) or simply by sending the time reference signal via a direct IR or RF link.

For example assuming that the PRN sequence starts at time t0, it will arrive at the remote control 14 from the source 12 after t=d/v seconds, where v is the known speed of sound and so d, the distance between the source 12 and the remote control 14 can be readily determined.

To measure t, the signal processing block 38 in the remote control 14 serves to replicate a number of delayed PRN sequences. The delay is known as the code phase and each replicated sequence is correlated with the signal from the microphone 34. By searching through the different code phases, the one corresponding to the highest correlation peak corresponds with the time t.

To guarantee certainty, the length of the PRN sequence should be selected to exceed the likely maximum distance.

While of course one positioning channel is sufficient for mere source identification and distance determination at least two channels are required for position determination within for example a room.

It is noted that most audio systems have between two and six independent audio channels which can allow very accurate positioning. With three or more channels, for instance, it would be possible to dispose of the time synchronization requirement, as the time offset would then be a by-product calculation. Alternatively, a 3D position could be computed.

In conclusion therefore, it should be appreciated that the invention discloses an arrangement creating a low-cost positioning system for an universal remote control device which can comprise an iPronto (trade mark) or Bluetooth enabled mobile device. It is also noted how this can help simplify the most common remote control requirements without compromising overall functionality.

Although not detailed above, it will of course be appreciated that the remote control 14 is arranged to produce one of a plurality of control signals, the one being produced being determined on the basis of the source identified so that the signal is the correct one for controlling that particular source within the audio system.

The invention claimed is:

1. An audio system for use with an audio source that provides an input audio signal and for use with acoustic sources, each acoustic source broadcasting a source identification signal, the system comprising:
   an acoustic source to combine an identification signal with the input audio signal to produce an output audio signal, the identification signal being different with respect to each other source identification signal for identifying the acoustic source; and
   a remote control device to control the acoustic source, to receive the output audio signal, and to distinguish the acoustic source from the other acoustic source based on the identification signal being different with respect to each other source identification signal.

2. An audio system as claimed in claim 1, further comprising another acoustic source configured to combine another identification signal that is different from the each other source identification signal with the input audio signal to produce another output audio signal, wherein the remote control device is configured to receive the other output audio signal and to distinguish between the acoustic source and the other acoustic source based on the identification signals, and wherein the identification signal included within the output audio signal is arranged to be inaudible.

3. An audio system as claimed in claim 1, wherein the input audio signal is modulated with the identification signal.

4. An audio system as claimed in claim 1, wherein the identification signal comprises a pseudo-random noise signal.

5. An audio system as claimed in claim 1, and including circuitry to determine the distance between the acoustic source and the remote control device.

6. An audio system as claimed in claim 5, wherein the circuitry to determine the said distance is responsive to a timed receipt of the identification signal.

7. An audio system as claimed in claim 6, wherein the remote control device is arranged to generate a timing reference signal and transmit the timing reference signal to the acoustic source.

8. An audio system as claimed in claim 6, wherein the acoustic source is arranged to produce a timing reference signal and to transmit an indication of the timing reference signal to the remote control unit.

9. An audio system as claimed in claim 5, wherein the said distance between the acoustic source and the remote control device is determined on the basis of the timed receipt of the audio output signal from the acoustic source at the remote control device.

10. An audio system as claimed in claim 1, wherein the remote control unit is arranged to transmit a controlling signal to the acoustic source serving to control the volume of the output audio signal in a manner responsive to a change in distance of the remote control device from the acoustic source.

11. An audio system as claimed in claim 10, wherein the change in distance is determined on the basis of a change in magnitude of the output audio signal as received at the remote control device.

12. An audio system as claimed in claim 1, further comprising circuitry to determine the position of the remote control device relative to the acoustic source on the basis of the identification signal received at the remote control device.

13. An audio system as claimed in claim 12, wherein the acoustic source is arranged to provide a respective output audio signal on at least two output channels, the acoustic source configured to combine a first identification signal with the input audio signal to produce the output audio signal provided on one of the output channels and to combine a second different identification signal with the input audio signal to produce the output audio signal provided on the other one of the output channels, and wherein the remote control device is configured to receive the output audio signals provided on the two output channels and to distinguish between the output audio signals based on the first and second identification signals.

14. An audio system as claimed in claim 13, wherein the remote control device is arranged to transmit a signal to the acoustic source serving to vary the output from at least one of the said channels in response to the determined position of the remote control device relative to the acoustic source, and wherein the output audio signals provided on the two output channels are left and right channels of stereo music.

15. An audio system as claimed in claim 13, wherein the remote control device is arranged to transmit a signal to the acoustic source serving to vary the output from at least one of the said channels in response to a change in position of the remote control device relative to the acoustic source.

16. An audio system as claimed in claim 15, further comprising
   a plurality of acoustic sources arranged to be located in a spaced relationship, each of the acoustic sources configured to combine a different identification signal with the input audio signal to produce a respective output audio signal, each of the different identification signals uniquely identifying one of the acoustic sources; and
   circuitry to hand-over the audio signal output there-between responsive to a control signal from the remote control device, the remote control device being arranged to generate the control signal responsive to determination of the change in location of the remote control device relative to the said plurality of acoustic sources, wherein the remote control device is configured to receive the output audio signals from each of the acoustic sources and to distinguish between the acoustic sources based on the different identification signals.

17. An audio system as claimed in claim 1, wherein the acoustic source is arranged such that the identification signal is included within the output audio signal and with a relatively high carrier frequency.

18. An audio system as claimed in claim 17 wherein the carrier frequency comprises at least a low ultrasound frequency.

19. A method of controlling an acoustic source arranged for outputting an audio signal, the method comprising:
   combining an identification signal with an input audio signal to produce an output audio signal, the identification signal identifying the acoustic source;
   receiving, at a remote control device arranged for control of the acoustic source, the output audio signal and another output audio signal that includes identification data for identifying another acoustic source;
   processing, by the remote control device, the received output audio signals to identify the acoustic source and to distinguish the acoustic source from other acoustic sources based on the identification signals; and
   transmitting a control signal from the remote control device to the identified acoustic source.

20. A method as claimed in claim 19, further comprising
combining another identification signal that is different from the identification signal with the input audio signal to produce the other output audio signal, the other identification signal identifying the other acoustic source;
receiving, at the remote control device, the other output audio signal;
processing, by the remote control device, the received output audio signals to distinguish the acoustic source from the other acoustic sources based on the identification signals; and
transmitting a first control signal from the remote control device to the acoustic source and transmitting a second different control signal from the remote control device to the other acoustic source, wherein the identification signal included within the output audio signal is arranged to be inaudible.

21. A method as claimed in claim 20, wherein the input audio signal is modulated with the identification signal.

22. A method as claimed in claim 19, wherein the identification signal comprises a pseudo-random noise signal.

23. A method as claimed in claim 19, further comprising determining a distance between the acoustic source and the remote control device.

24. A method as claimed in claim 23, wherein the remote control unit is arranged to transmit the control signal to the acoustic source to control the volume of the output audio signal in a manner responsive to a change in the distance of the remote control device from the acoustic source.

25. A method as claimed in claim 24, wherein the change in distance is determined on the basis of a change in magnitude of the output audio signal as received at the remote control device.

26. A method as claimed in claim 19, further comprising determining a position of the remote control device relative to the acoustic source on the basis of the identification signal received at the remote control device.

27. An acoustic source for use in an audio system which includes an audio source that provides an input audio signal, other acoustic sources and a remote control device that controls the acoustic sources responsive to respective output audio signals provided by each of the acoustic sources, the acoustic source comprising:
circuitry to combine an identification signal with the input audio signal to produce one of the output audio signals, the identification signal received from the remote control device and identifying the acoustic source and distinguishing the acoustic source from the other acoustic sources based on the identification signal being different from an identification signal included in another output audio signal; and
circuitry to provide the one output audio signal to the remote control device.

28. A remote control device for controlling an output audio signal provided by an acoustic source, the acoustic source combining an identification signal with an input audio signal to produce the output audio signal, the identification signal identifying the acoustic source, the remote control device comprising:
circuitry, including an antenna, to receive the output audio signal along with another audio signal including a source identification signal to identify another acoustic source;
circuitry, including a processor, to process the received output audio signal to identify the acoustic source and to distinguish the acoustic source from other acoustic sources based on the identification signals; and
circuitry, including a transmitter, to transmit a control signal to the identified acoustic source.

29. A remote control device as claimed in claim 28, wherein the remote control device is configured to store data that uniquely identify a plurality of acoustic sources relative to each other, and the remote control device further configured to compare the identification signal received from the acoustic source to the stored data to distinguish the acoustic source from the other acoustic sources.

30. A remote control device for controlling an output audio signal provided by an acoustic source, the acoustic source combining an identification signal with an input audio signal to produce the output audio signal, the identification signal identifying the acoustic source, the remote control device comprising:
circuitry, including an antenna, to receive the output audio signal;
circuitry, including a processor that stores data to differentiate identification signals of respective acoustic appliances, to process the received output audio signal to identify the acoustic source and to distinguish the acoustic source from other acoustic sources based on the identification signal; and
circuitry, including a transmitter, to transmit a control signal to the identified acoustic source.

* * * * *